US010764284B2

(12) United States Patent
Chiaverini et al.

(10) Patent No.: US 10,764,284 B2
(45) Date of Patent: Sep. 1, 2020

(54) METHOD AND SYSTEM FOR DYNAMIC DATA FLOW ENFORCEMENT

(71) Applicant: Verizon Patent and Licensing Inc., Arlington, VA (US)

(72) Inventors: Marc Chiaverini, Randolph, NJ (US); Barry F. Hoffner, Bridgewater, NJ (US); Richard Tom, San Francisco, CA (US); Gregory Femec, San Francisco, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 247 days.

(21) Appl. No.: 15/697,645

(22) Filed: Sep. 7, 2017

(65) Prior Publication Data
US 2019/0075107 A1   Mar. 7, 2019

(51) Int. Cl.
*H04L 29/06* (2006.01)
*H04L 12/813* (2013.01)
*H04W 88/16* (2009.01)
*H04L 29/08* (2006.01)

(52) U.S. Cl.
CPC ........ *H04L 63/0876* (2013.01); *H04L 47/20* (2013.01); *H04L 63/10* (2013.01); *H04L 63/20* (2013.01); *H04L 67/141* (2013.01); *H04W 88/16* (2013.01)

(58) Field of Classification Search
CPC ......... H04L 43/08; H04L 45/64; H04L 63/20; H04L 12/4633; H04L 63/0272; H04L 63/0876; H04L 47/20; H04L 63/10; H04L 67/141; H04L 29/06; H04L 12/813; H04W 88/16
See application file for complete search history.

(56) References Cited

U.S. PATENT DOCUMENTS

| | | | | |
|---|---|---|---|---|
| 7,224,272 B2* | 5/2007 | White, II | ................ | H04B 3/54 340/12.37 |
| 7,793,334 B2* | 9/2010 | Lewis | .................. | H04L 63/083 726/17 |
| 8,271,034 B2* | 9/2012 | Rieger | ................... | H04L 41/12 455/556.1 |
| 8,520,615 B2* | 8/2013 | Mehta | .................. | H04W 8/082 370/329 |
| 8,990,316 B1* | 3/2015 | Feinstein | ............... | H04L 51/34 709/206 |
| 2010/0197293 A1* | 8/2010 | Shem-Tov | ........... | G06F 21/305 455/420 |
| 2012/0240185 A1* | 9/2012 | Kapoor | .............. | H04L 63/1425 726/1 |
| 2012/0303949 A1* | 11/2012 | Liu | ..................... | H04L 63/0272 713/153 |
| 2017/0230797 A1* | 8/2017 | Lauterbach | .......... | H04W 4/046 |

\* cited by examiner

*Primary Examiner* — Alexander Lagor
*Assistant Examiner* — Howard H. Louie

(57) ABSTRACT

A method, a device, and a non-transitory storage medium are described in which destination device identifiers associated with network devices are subject to a validation process before an end device attempts to establish a communication session with a network device. Based on an outcome of the validation process, a data flow subsequently established by the end device may be subject to a rule provided under a data usage plan subscribed to by the end device or another rule.

20 Claims, 18 Drawing Sheets

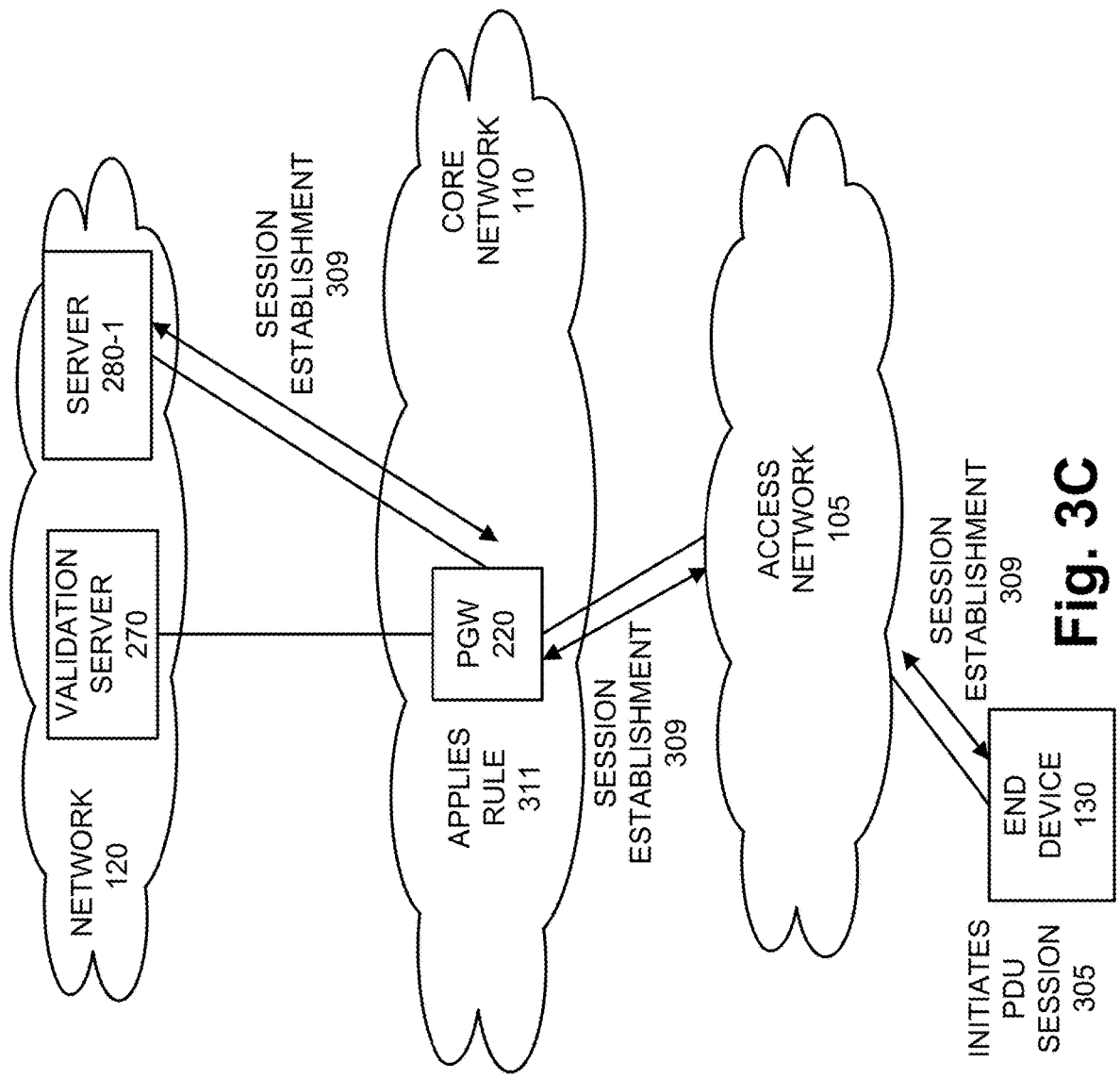

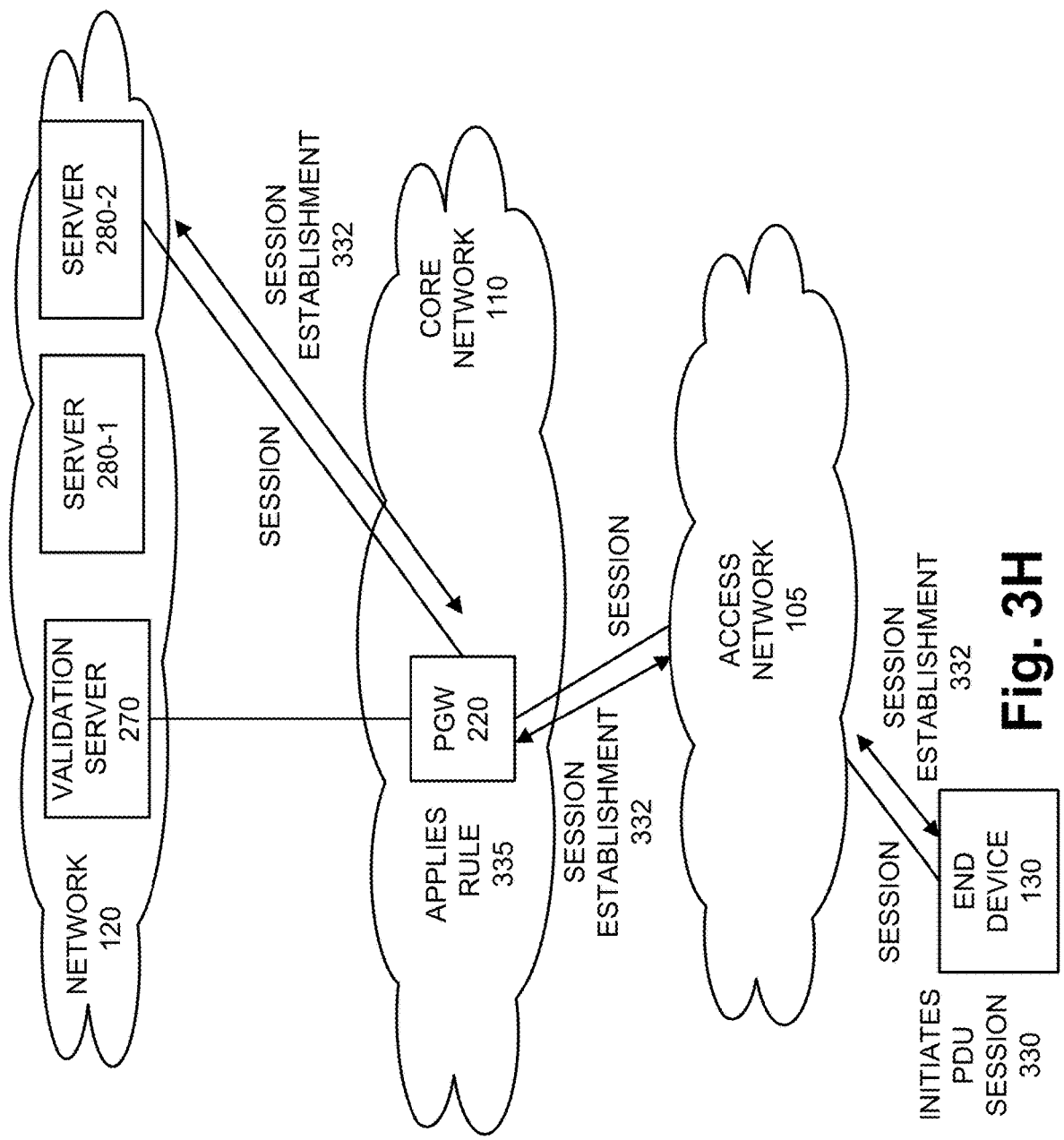

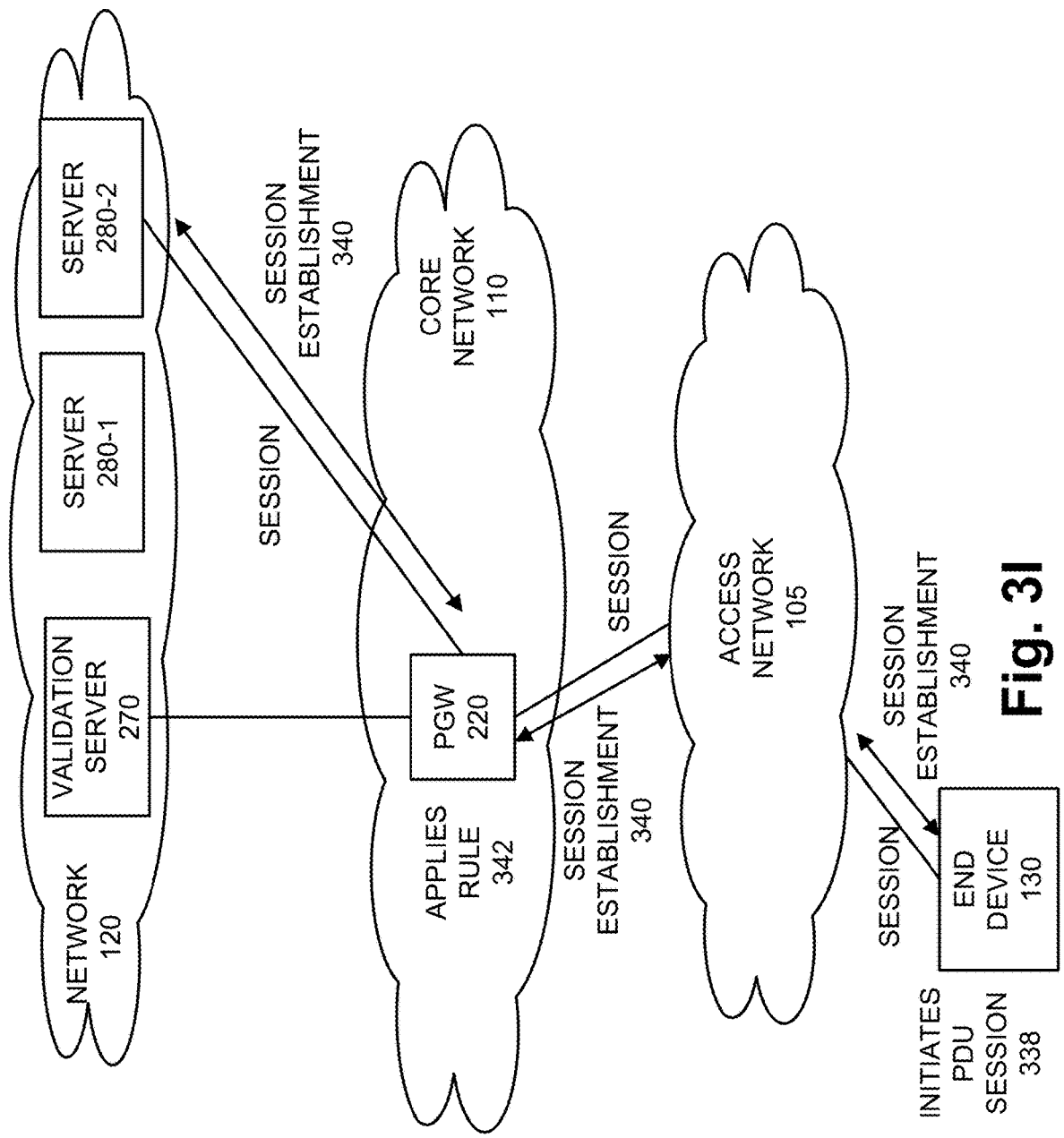

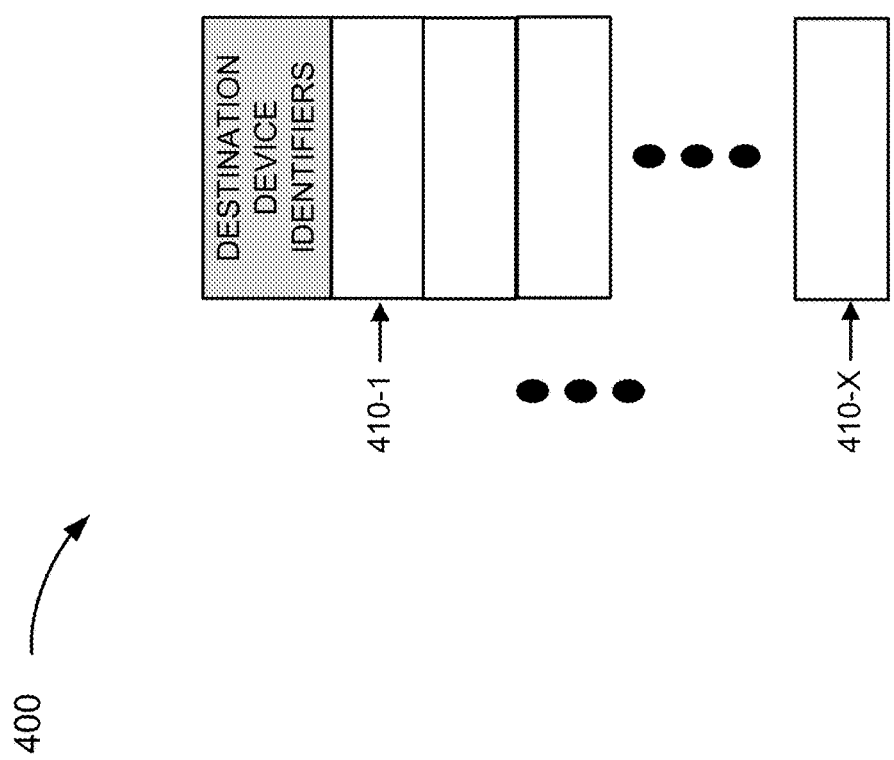

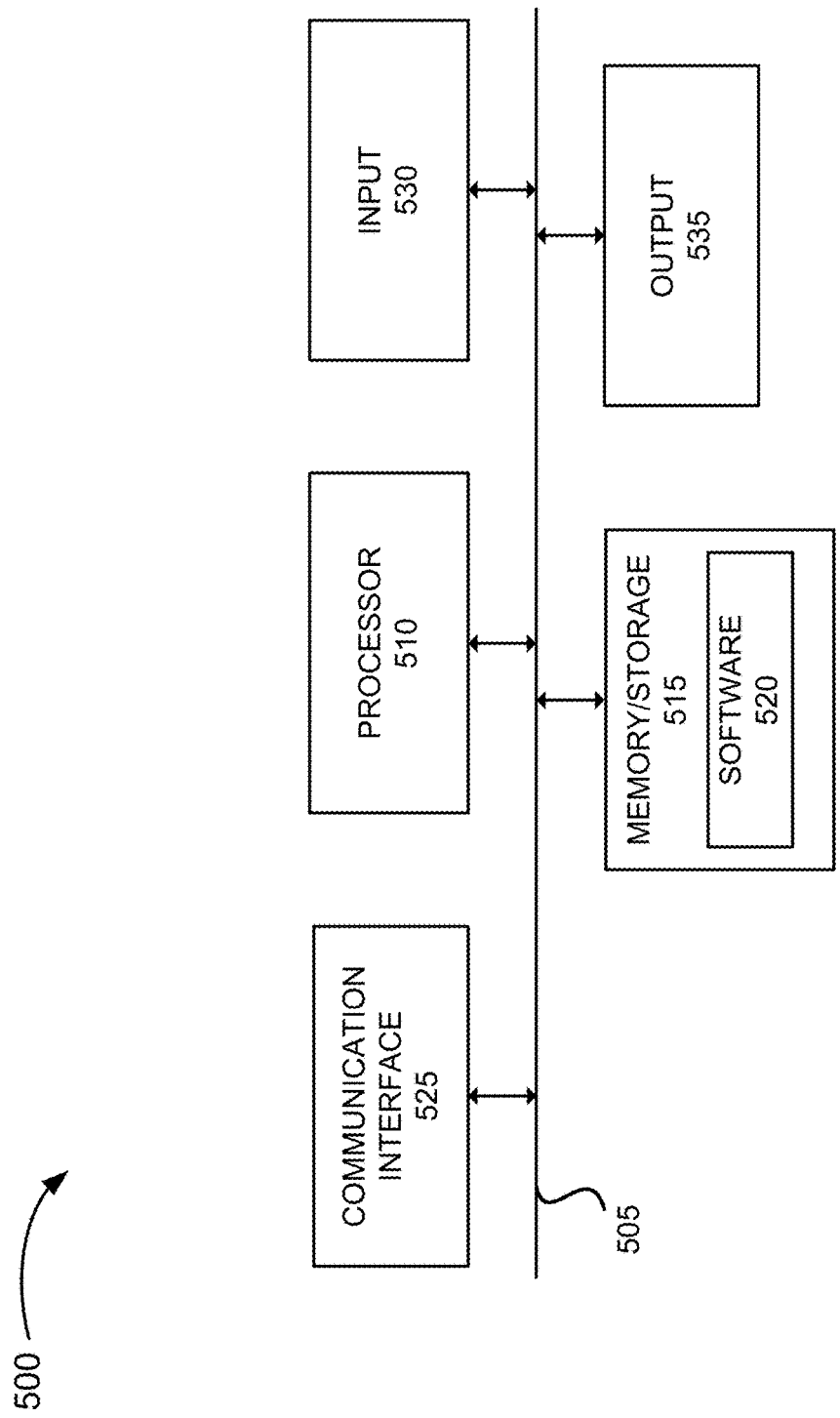

US 10,764,284 B2

METHOD AND SYSTEM FOR DYNAMIC DATA FLOW ENFORCEMENT

BACKGROUND

In a network, traffic or data flows to and from end devices may be governed by various parameters. For example, network devices in the network may manage data flows based on rules and policies, subscription information, and characteristics of the data flow (e.g., bit rates, type of data flow (e.g., video, voice, etc.)).

BRIEF DESCRIPTION OF THE DRAWINGS

FIGS. 3A-3I are diagrams illustrating an exemplary process of the data flow management service;

FIG. 4A is a diagram illustrating an exemplary data structure that stores exemplary validation information;

FIG. 5 is a diagram illustrating exemplary components of a device that may correspond to one or more of the devices illustrated herein;

DETAILED DESCRIPTION OF PREFERRED EMBODIMENTS

Figure 1:
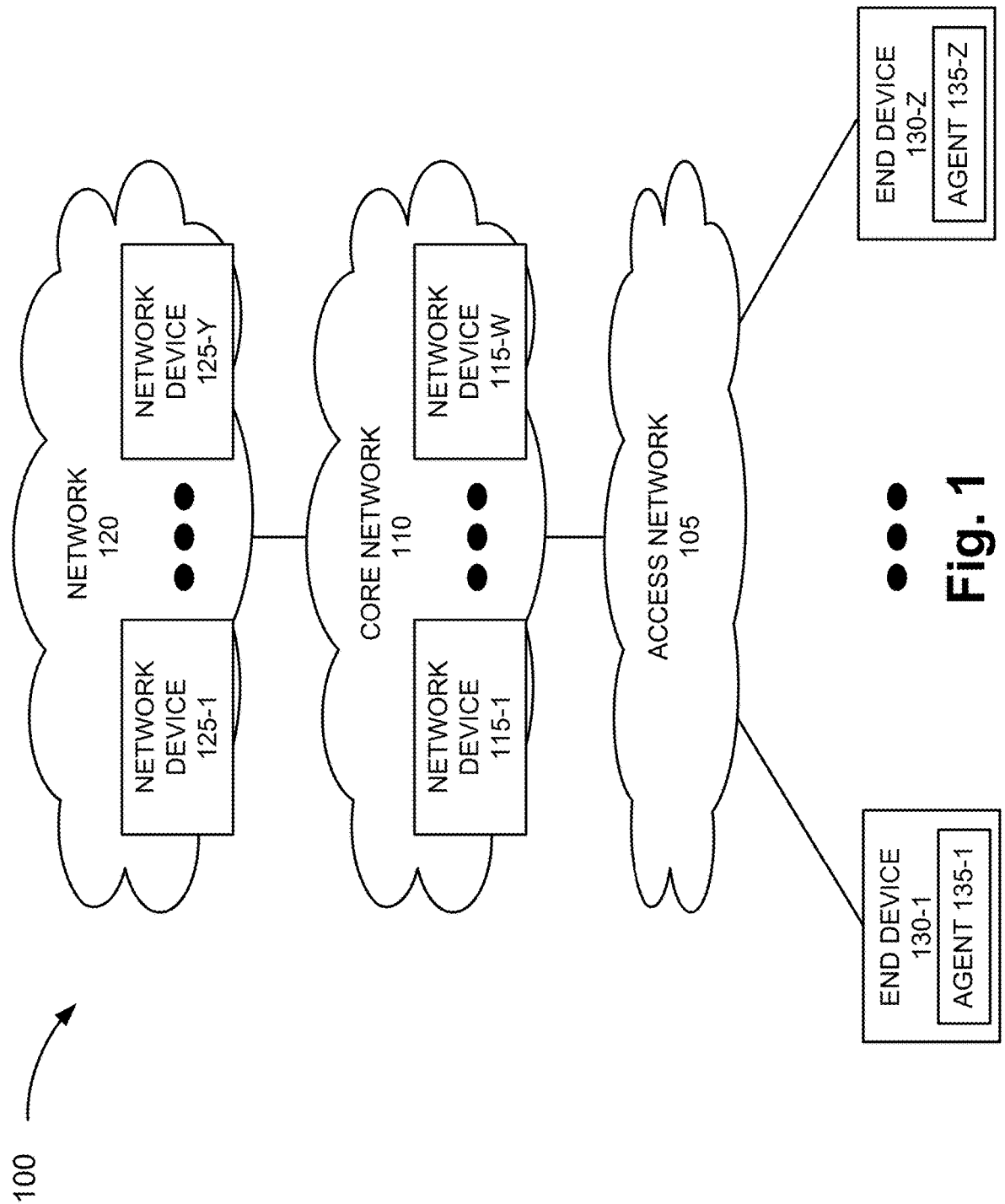
FIG. 1 is a diagram illustrating an exemplary environment in which an exemplary embodiment of a data flow management service may be implemented.

The following detailed description refers to the accompanying drawings. The same reference numbers in different drawings may identify the same or similar elements. Also, the following detailed description does not limit the invention.

A network may select and apply a rule to a data flow based on an identifier (e.g., a Quality of Service (QoS) Flow Identity (QFI), a QoS Class Identifier (QCI), a packet flow identifier, a packet data unit (PDU) session identifier, etc), and/or other types of information (e.g., flow information, such as 5-tuple information; a Differentiated Services Code Point (DSCP) value; etc.). The network may also select and apply the rule based on a data service subscription associated with an end device to which the data flow pertains. The data service subscription may include paid and/or free data usage, and some or all of the data usage afforded under the data service subscription may be limited to certain destination devices, uniform resource identifiers (URIs), hosts, and/or other parameters (e.g., time of day, location of an end user, etc.).

During a data session, however, the end device may visit a destination device or a URI that may be managed differently than the permitted destination devices or URIs under a data usage. As an example, an end user, via an application resident on the end device, may visit a streaming server that streams a football game. During the streaming session, the end device may be directed to visit an advertisement (ad) server during an ad break. From the network perspective, the data flow between the end device and the ad server may not be managed in the same manner under the data service subscription and/or associated data usage as the data flow with the streaming server. For example, the data flow with the streaming server may be free, has some other charging rate, and/or has particular traffic shaping parameters. In this regard, the network may select and apply a rule for the data flow to/from the ad server that is different from the rule applied to the data flow to/from the streaming server that streams the football game even though the data flows occur within the same packet data unit (PDU) session.

Additionally, for example, the streaming server may randomly select the ad server during the ad break. Further, the random selection of the ad server may be based on the location of the end user. Thus, in view of these random factors, the network cannot be pre-configured to apply the same rule (e.g., in terms of charging, QoS, traffic shaping parameters, etc.) to both data flows or apply different rules to both data flows. As a result, the network may be unable to adhere to billing, traffic, and/or QoS parameters afforded under the data service subscription and/or associated data usage that are due to the end user.

According to exemplary embodiments, a data flow management service is described. According to an exemplary embodiment, an end device includes logic that provides the data flow management service. For example, the end device includes logic that transmits a message to a network device, via an anchoring network device, when the data flow management service is to be applied to a data flow, as described herein. The message may be transmitted to the network device before a data flow between the end device and a destination device is initiated. The message may include, for example, a full or a portion of a URI, a hostname, or a server name indication (SNI) of the destination device (referred to as "destination device identifier").

According to an exemplary embodiment, the network device includes logic that provides the data flow management service. For example, in response to receiving the message from the end device, the network device may analyze the message and determine if the data flow to be established is valid. For example, the network device may be able to determine whether or not the data flow is valid based on the destination device identifier of the destination device. The network device may store, for comparison, destination device identifiers of the destination devices that end devices may establish data flows using the data flow management service. Based on the result of the comparison, the network device may validate or not validate the destination device identifier associated with the data flow to be established. According to other exemplary embodiments, the network device may store, for comparison, destination device identifiers of destination devices that end devices may not establish data flows using the data flow management service, or both. According to still other exemplary embodiments, the network device may perform other operations, as described herein.

According to an exemplary embodiment, when the destination device identifier is validated, the network device transmits to the end device, via the anchoring network device, a response to the message. However, when the destination device identifier is not validated, the network device does not transmit to the end device a response to the message. According to other exemplary embodiments, the network device may transmit to the end device, via the anchoring network device, a response to the message, regardless of whether the destination device identifier is valid or not. For example, the message may indicate that the destination device identifier is valid or not valid.

According to an exemplary embodiment, an anchoring network device includes logic that provides the data flow management service. According to an exemplary embodiment, the anchoring network device selects and applies a rule to a data flow of an end device based on an outcome of the validation process performed by the network device. For example, when the anchoring network device receives a response to the message, which indicates that the destination device identifier is valid, the anchoring network device will select and apply a rule to the data flow, when the data is established, according to the data flow management service. However, for example, when the anchoring network device receives a response to the message, which indicates that the destination device identifier is not valid, or does not receive a response to the message, the anchoring network device may select and apply a rule to the data flow, when the data flow is established, that is not according to the data flow management service. For example, continuing with the example described above, subsequent to receiving the response from the network device, the end device may initiate a data flow with the ad server via the anchoring network device. The anchoring network device may inspect the data flow to determine a destination device identifier pertaining to the data flow. Based on a comparative process, as described herein, the anchoring network device may determine whether the destination device identifier is valid or not. When the destination device identifier is valid, the anchoring network device may apply the same rule as the one applied to the data flow with the streaming server. However, when the destination device identifier is not valid, the anchoring network device may apply a rule that is different from the rule applied to the data flow of the streaming server. Additionally, as described herein, the anchoring network device may apply the same or different traffic shaping parameters to the ad server data flow relative to the streaming server data flow. According to an exemplary embodiment, the anchoring network device provides the data flow management service only to data flows that are included in a same PDU session. For example, a PDU session may include one or multiple PDU flows, and a PDU flow may include one or multiple service data flows (SDFs).

As a result, the data flow management service may improve the accuracy of managing and enforcing of data flows and data usages of end users. Additionally, the data flow management service may minimize unnecessary allocation of network resources stemming from, for example, traffic shaping parameter values, based on the identification of data flows that occur during the execution of the data flow management service.

FIG. 1 is a diagram illustrating an exemplary environment 100 in which an exemplary embodiment of a data flow management service may be implemented. As illustrated, environment 100 includes an access network 105, a core network 110, and a network 120. Core network 110 includes network devices 115-1 through 115-W (also referred to collectively as network devices 115 and, individually or generally as network device 115). Network 120 includes network devices 125-1 through 125-Y (also referred to collectively as network devices 125 and, individually, or generally as network device 125). Environment 100 also includes end devices 130-1 through 130-Z (also referred to collectively as end devices 130 and, individually or generally as end device 130). According to other embodiments, environment 100 may include additional networks, fewer networks, and/or different types of networks than those illustrated and described herein.

Environment 100 includes communication links between the networks and between the devices. Environment 100 may be implemented to include wired, optical, and/or wireless communication links among the devices and the networks illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device). The number and the type of devices illustrated in environment 100 are exemplary.

Access network 105 includes one or multiple networks of one or multiple types. For example, access network 105 may be implemented to include a terrestrial network, a wireless network and, a wired network and/or an optical network. According to an exemplary implementation, access network 105 includes a radio access network (RAN). For example, the RAN may be implemented as a Third Generation (3G) RAN, a 3.5G RAN, a Fourth Generation (4G) RAN, a 4.5G RAN, or a future generation RAN (e.g., a Fifth Generation (5G) RAN). By way of further example, access network 105 may include an Evolved UMTS Terrestrial Radio Access Network (E-UTRAN) of a Long Term Evolution (LTE) network or an LTE-Advanced (LTE-A) network, a U-TRAN, a 5G-access network (5G-AN or 5G-RAN), a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, an Evolution Data Optimized (EV-DO) RAN, or the like (e.g., a public land mobile network (PLMN), etc.).

Access network 105 may also include other types of networks, such as a WiFi network, a Worldwide Interoperability for Microwave Access (WiMAX) network, a local area network (LAN), a personal area network (PAN), or other type of network that provides access to or can be used as an on-ramp to access network 105 and/or core network 110.

Depending on the implementation of access network 105, access network 105 may include various types of wireless devices. For example, access network 105 may be implemented to include an evolved Node B (eNB), a remote radio head (RRH), an RRH and a baseband unit (BBU), a BBU, a next generation Node B (gNB), a base station (BS), a base transceiver station (BTS), a radio network controller (RNC), a Node B, or other type of wireless node that provides wireless access to access network 105 (e.g., a home eNB, a femto device, a pico device, a repeater, etc.). According to various exemplary embodiments, the wireless devices may be implemented according to various architectures of wireless service, such as, for example, macrocell, microcell, femtocell, picocell, metrocell, non-cell, or other configuration.

Core network 110 includes one or multiple networks of one or multiple types. According to an exemplary implementation, core network 110 may include a complementary network pertaining to the one or multiple RANs described. For example, core network 110 may include a core part of an LTE network or an LTE-Advanced network (e.g., an evolved packet core (EPC) network), a CDMA core network, a GSM core network (e.g., a network switching subsystem (NSS)), a core network of a next generation wireless network (e.g., a 5G core network, etc.), and so forth.

Depending on the implementation of core network 110, core network 110 may include various types of network devices 115, such as, for example, a gateway device, a support node, a serving node, a mobility management entity (MME), a core access and mobility management function (AMF), a session management function (SMF), a policy control function (PCF), as well other network devices that provide various network-related functions and/or services, such as charging and billing, security, authentication and authorization, network policy enforcement, management of subscriber profiles, and/or other functions and/or services that facilitate the operation of the core network.

According to an exemplary embodiment, one or multiple network devices 115 of core network 110 include logic that provides the data flow management service, as described herein. For example, network device 115 that provides the data flow management service may be implemented by a packet data network gateway (PGW) of an LTE or LTE-A core network, a User Plane Function (UPF) device of a 5G core network, a Home Agent (HA) of a Mobile IP network, a gateway GPRS Support Node (GGSN) of a General Packet Radio Service (GPRS) core network, or some other node that is anchor in the core network for PDU sessions of end devices and includes packet inspection capabilities.

According to an exemplary embodiment, network device 115 includes logic that enforces rules associated with data flows subject to the data flow management service. Network device 115 includes logic that enforces the rules based on a validation process pertaining to the data flows, which is performed by network device 125. Network device 115 includes logic that transmits and receives messages that support the validation process between end device 130 and network device 125. According to an exemplary embodiment, the messages are transmitted and received on a data plane. For example, end device 130 may transmit a message, which carries flow data (e.g., a destination device identifier), via network device 115, to network device 125. Additionally, network device 125 may transmit a response to the message, via network device 115, to end device 130, or network device 125 may omit to transmit a response, as previously described. Based on the outcome of the validation process, network device 115 includes logic that selects and applies a corresponding rule to the data flow to which the data flow management service pertains, as described herein. For example, subsequent to the validation process, end device 130 may establish a communication session with the destination device via network device 115.

Network 120 includes one or multiple networks of one or multiple types. For example, network 120 may be implemented to provide an application and/or a service to end device 130. For example, network 120 may be implemented to include a service or application-layer network, the Internet, the World Wide Web, an Internet Protocol Multimedia Subsystem (IMS) network, a Rich Communication Service (RCS) network, a cloud network, a packet-switched network, a Public Switched Telephone Network (PSTN), a Signaling System No. 7 (SS7) network, a telephone network, a private network, a public network, a telecommunication network, an IP network, a wired network, a wireless network, or some combination thereof.

Depending on the implementation of network 120, network 120 may include various network devices 125, such as, for example, a server (e.g., a Voice over Internet Protocol (VoIP) server, a streaming server, an end-user application server, a Session Initiation Protocol (SIP) server, an e-mail server, a web server, an application server, etc.), a Short Message Service Center (SMSC), a Multimedia Message Service Center (MMSC), a Call Session Control Function (CSCF), a gateway device, as well other network devices that provide various network-related functions and/or services, such as charging and billing, security, authentication and authorization, network policy enforcement, management of subscriber profiles, and/or other functions and/or services that facilitate the operation of network 120.

According to an exemplary embodiment, one or multiple network devices 125 of network 120 include logic that provides the data flow management service, as described herein. For example, network device 125 that provides the data flow management service may be implemented by a server that is configured to perform a validation process for destination device identifiers, as described herein. Network device 125 includes logic that determines whether a destination device identifier is valid based on a destination device identifier received from end device 130 via network device 115. According to an exemplary embodiment, network device 125 includes logic that stores destination device identifiers that are used for comparison to the destination device identifier received from end device 130. For example, the stored destination device identifiers may include a repository of valid destination device identifiers, a repository of invalid destination device identifiers, or both. Network device 125 includes logic that transmits and receives messages that support the validation process between end device 130 and network device 125. According to an exemplary embodiment, the messages are transmitted and received on a data plane.

End device 130 includes a device that has computational and wireless communication capabilities. End device 130 may be implemented as a mobile device, a portable device, or a stationary device. For example, end device 130 may be implemented as a smartphone, a personal digital assistant, a tablet, a netbook, a phablet, a wearable device, a smart television, a game system, a music playing system, or some other type of wireless user device.

As illustrated in FIG. 1, end devices 130 include agents 135-1 through 135-Z (also referred to collectively as agents 135 and, individually or generally as agent 135). According to an exemplary embodiment, agent 135 includes logic that provides a data flow management service, as described herein. Agent 135 may be implemented to include software. For example, the software may be implemented as a mobile application, a browser application, a plug-in, a stand-alone application, a computer program, a script, or other executable entity, that when executed, may perform the data flow management service. According to various exemplary embodiments, end device 130 may be configured to execute various types of software (e.g., applications, programs, etc.). The number and the types of software may vary from one end device 130 to another end device 130. In this regard, end device 130 may include some software that does not include agent 135.

Agent 135 includes logic that transmits and receives messages that support the validation process between end device 130 and network device 125. According to an exemplary embodiment, in response to a trigger event, agent 135 generates and transmits a message, which carries a destination device identifier, to network device 125, via network device 115, as described herein. For example, agent 135 includes logic that selects the destination identifier to be validated when a communication session is to be established with a destination device. According to an exemplary embodiment, agent 135 may be pre-configured with a destination device identifier. For example, a mobile application that includes agent 135 may be pre-configured with a destination device identifier that is used to establish a communication session with a particular destination device. By way of further example, according to the previously described exemplary scenario, the mobile application may be pre-configured with the destination device identifier of the streaming server. According to another exemplary embodiment, agent 135 may obtain a destination device identifier subsequent to the establishment of a communication session. For example, according to the previously described exemplary scenario, the mobile application may establish a communication session with a streaming server, and during the session, the streaming server may provide the destination device identifier of the ad server. According to an exemplary embodiment, the message, which includes the destination device identifier, may be transmitted before a connection between end device 130 and the destination device to which the destination device identifier pertains, is established. The messages may be transmitted and received on the data plane.

Figure 2:
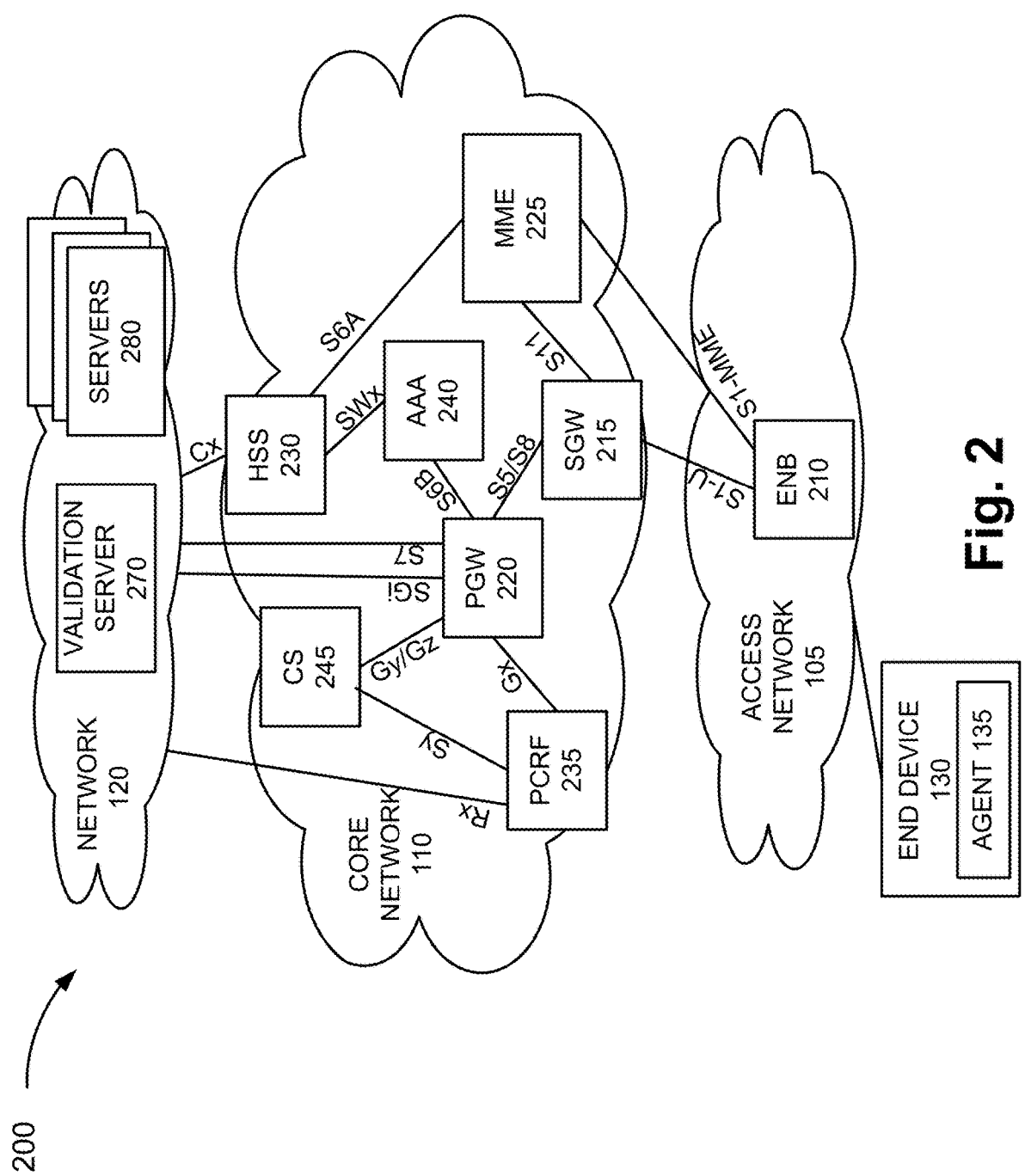
FIG. 2 is a diagram illustrating another exemplary environment in which an exemplary embodiment of the data flow management service may be implemented.

FIG. 2 is a diagram illustrating another environment 200 in which an exemplary embodiment of the data flow management service may be implemented. According to this exemplary implementation, access network 105 may be implemented to include an E-UTRAN of an LTE network or an LTE-A network. For example, access network 105 includes an eNB 210. Additionally, according to this exemplary implementation, core network 110 may be implemented to include an evolved packet core (EPC) of an LTE network or an LTE-A network. As illustrated, core network 110 includes a serving gateway (SGW) 215, a packet data network (PDN) gateway (PGW) 220, an MME 225, a home subscriber server (HSS) 230, a policy charging and rules function (PCRF) 235, an authentication, authorization, and accounting (AAA) server 240, and a charging system (CS) 245, which may correspond to network devices 115 depicted in FIG. 1. According to an exemplary embodiment, PGW 220 may include logic that provides the data flow management service. According to an exemplary embodiment, PCRF 235 may store a rule that supports the data flow management service, as described herein.

Network 120 includes a validation server 270, which may correspond to network device 125 depicted in FIG. 1. According to an exemplary embodiment, validation server 270 may include logic that provides the data flow management service. Network 120 may also include servers 280, which may correspond to other network devices 125. According to other embodiments, environment 200 may include additional networks and/or different types of networks than those illustrated and described herein.

As further illustrated in FIG. 2, there are exemplary communication links and interfaces between the network devices. The number and arrangement of communication links illustrated in FIG. 2 are exemplary. Additionally, given the numerous protocols, standards, and proprietary frameworks that may be implemented, additionally and/or different interfaces may be used. Similar to that previously described in relation to environment 100, environment 200 may be implemented to include wired, optical, and/or wireless communication links among the devices and the networks illustrated. A communicative connection via a communication link may be direct or indirect. For example, an indirect communicative connection may involve an intermediary device and/or an intermediary network not illustrated in FIG. 2. Further, a device may be implemented according to various computing architectures and/or network architectures, as previously described. Also, the number and the type of network devices are exemplary.

eNB 210, SGW 215, PGW 220, MME 225, and PCRF 235 may each operate and provide a function according to a standard (e.g., Third Generation Partnership Project (3 GPP), etc.) or a proprietary technology. Additionally, PGW 220 may provide the data flow management service, as described herein. HSS 230 includes a network device that stores user subscription and user profile data. HSS 230 may also perform other services (e.g., authentication, authorization, etc.). According to an exemplary implementation, HSS 230 may include a Subscriber Profile Repository (SPR). AAA 240 includes a network device that provides authentication, authorization, and accounting services. CS 245 includes a network device that provides an off-line data flow management service and/or an on-line data flow management service. The off-line/on-line data flow management service includes the generation of charging data records (CDRs) for a billing system or a billing domain.

FIGS. 3A-3I are diagrams illustrating an exemplary process of the data flow management service. The messages explained and illustrated are exemplary and may not represent each and every message that may be exchanged. Additionally, depending on the implementation of the environment, the data flow management service may use different messages, which carry flow data as described herein, in support of the data flow management service.

Figure 3A:
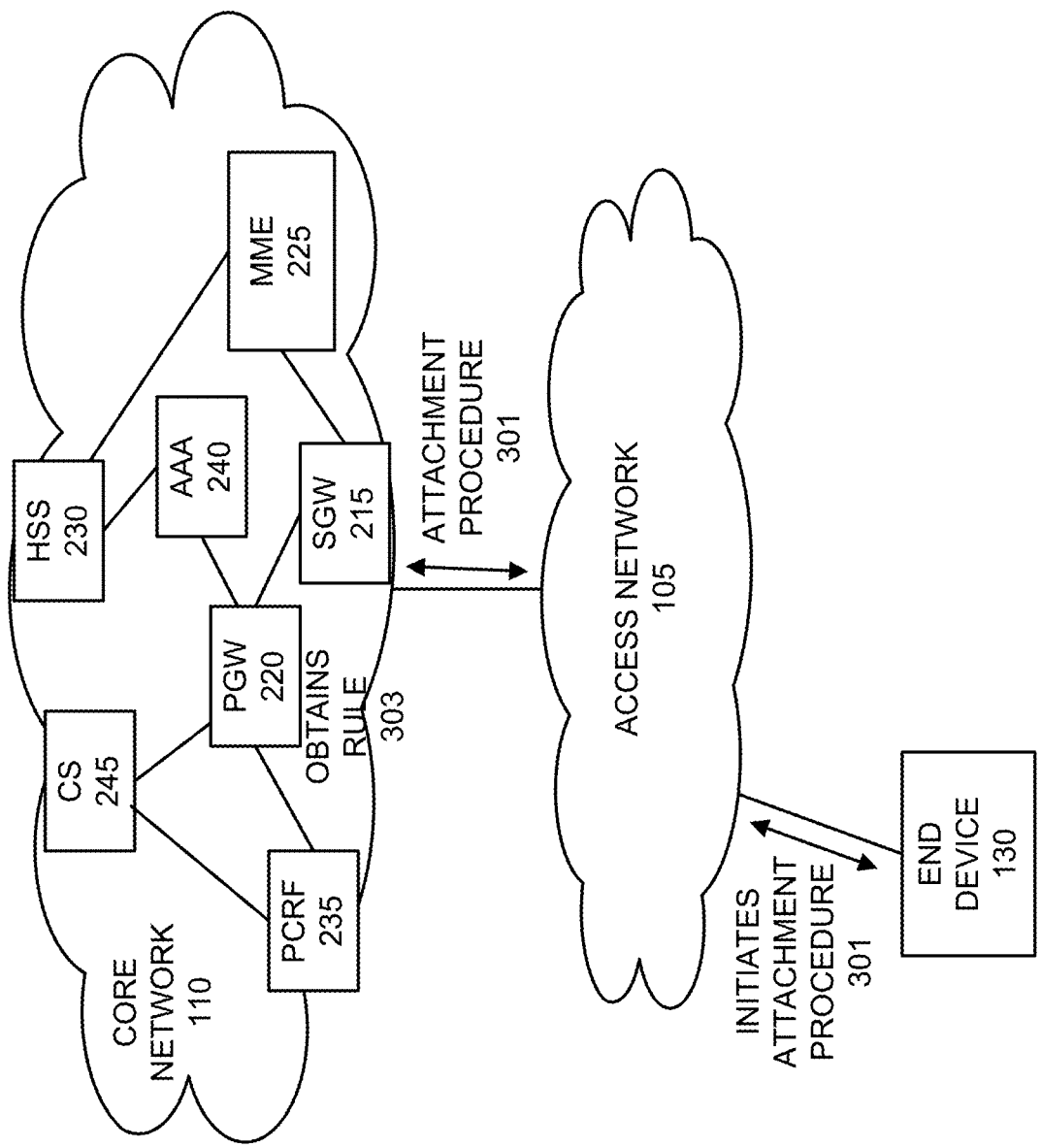
Figure 3B:
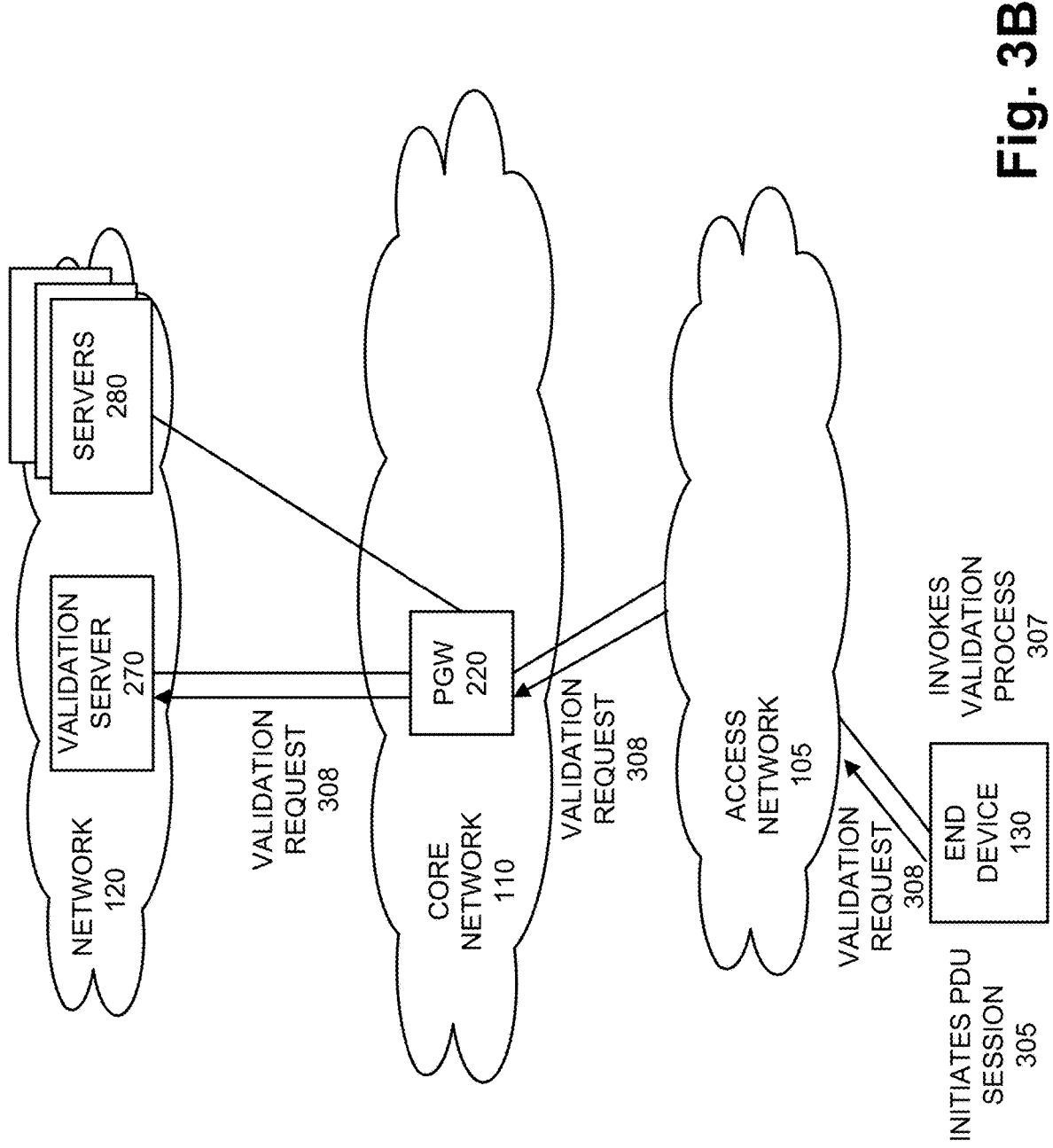

Referring to FIG. 3A, end device 130 initiates an attachment procedure (301) with core network 110 via access network 105. During the attachment procedure, although not illustrated, end device 130 may be authenticated and authorized, a PGW may be selected, a default bearer may be established, and policy control and charging (PCC) information pertaining to end device 130 may be obtained by the PGW (e.g., PGW 220). For example, during an IP-CAN Session Establishment procedure between PGW 220 and PCRF 235, PGW 220 may obtain the PCC information, which may include a rule (303) associated with the data flow management service, as described herein.

According to various exemplary embodiments, end device 130 may initiate a validation process before an initial establishment of a PDU session with a destination device and/or during a PDU session. For example, a user (not illustrated) may launch a mobile application via end device 130. Agent 135 (not shown in FIGS. 3A-3I) may be configured with a destination device identifier that may not require validation. By way of further example, the mobile application that provides a service or content may initially establish a PDU session with the destination device without initiating the validation process. According to this exemplary embodiment, subsequent to the establishment PDU session, as previously described, the destination device may select another destination device, which initiates another data flow that may require the invocation of the validation process.

According to other exemplary embodiments, the user may launch the mobile application, and agent 135 may perform the validation process before the initial establishment with the destination device. For example, referring to FIG. 3B, the user may initiate a PDU session (305) via software that includes agent 135. In response, agent 135 may invoke a validation process (307). For example, the validation process may include generating and transmitting a validation request (308) to validation server 270 via access network 105 and PGW 220. The validation process is described further below.

Figure 3D:
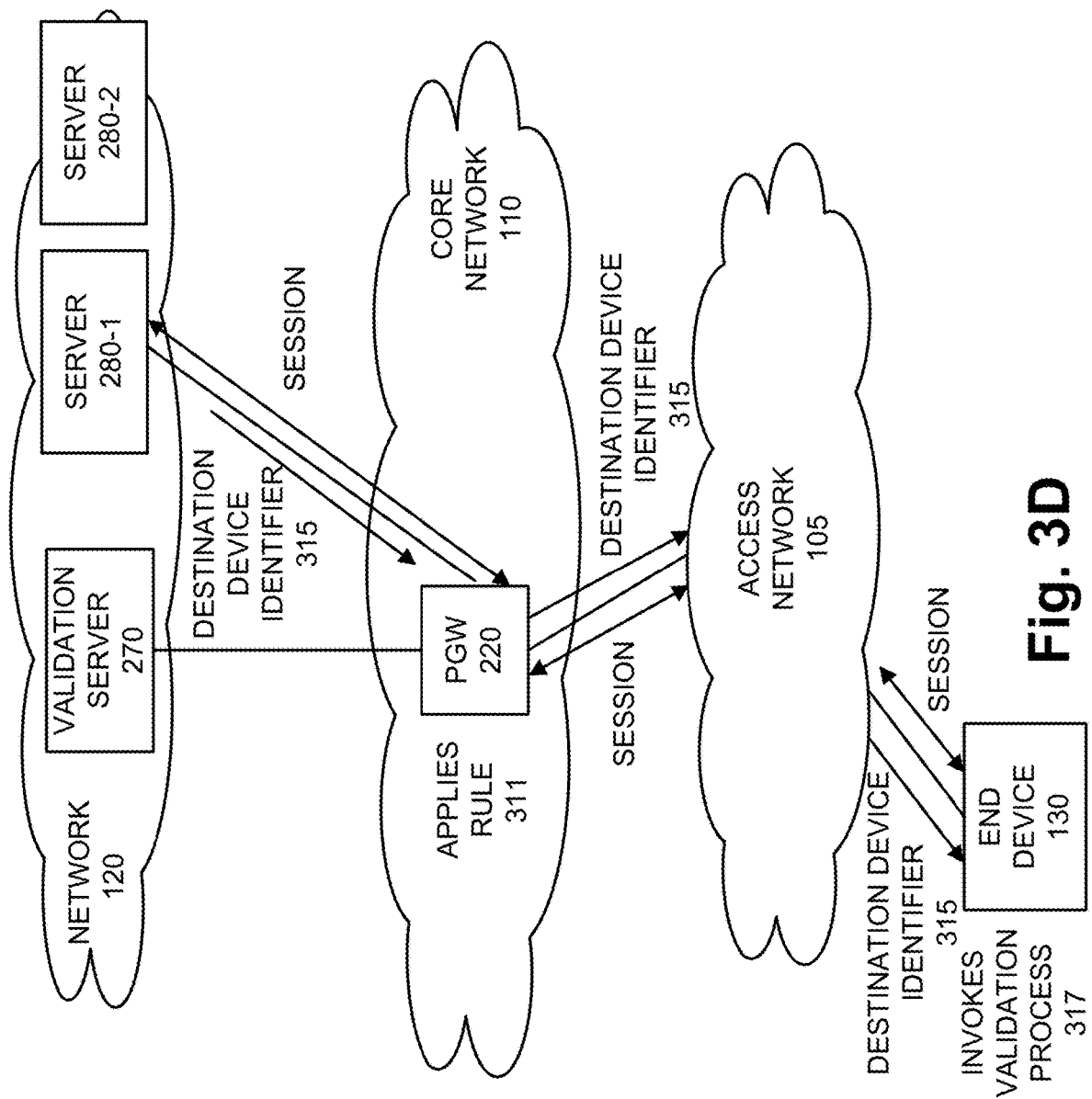
Figure 3E:
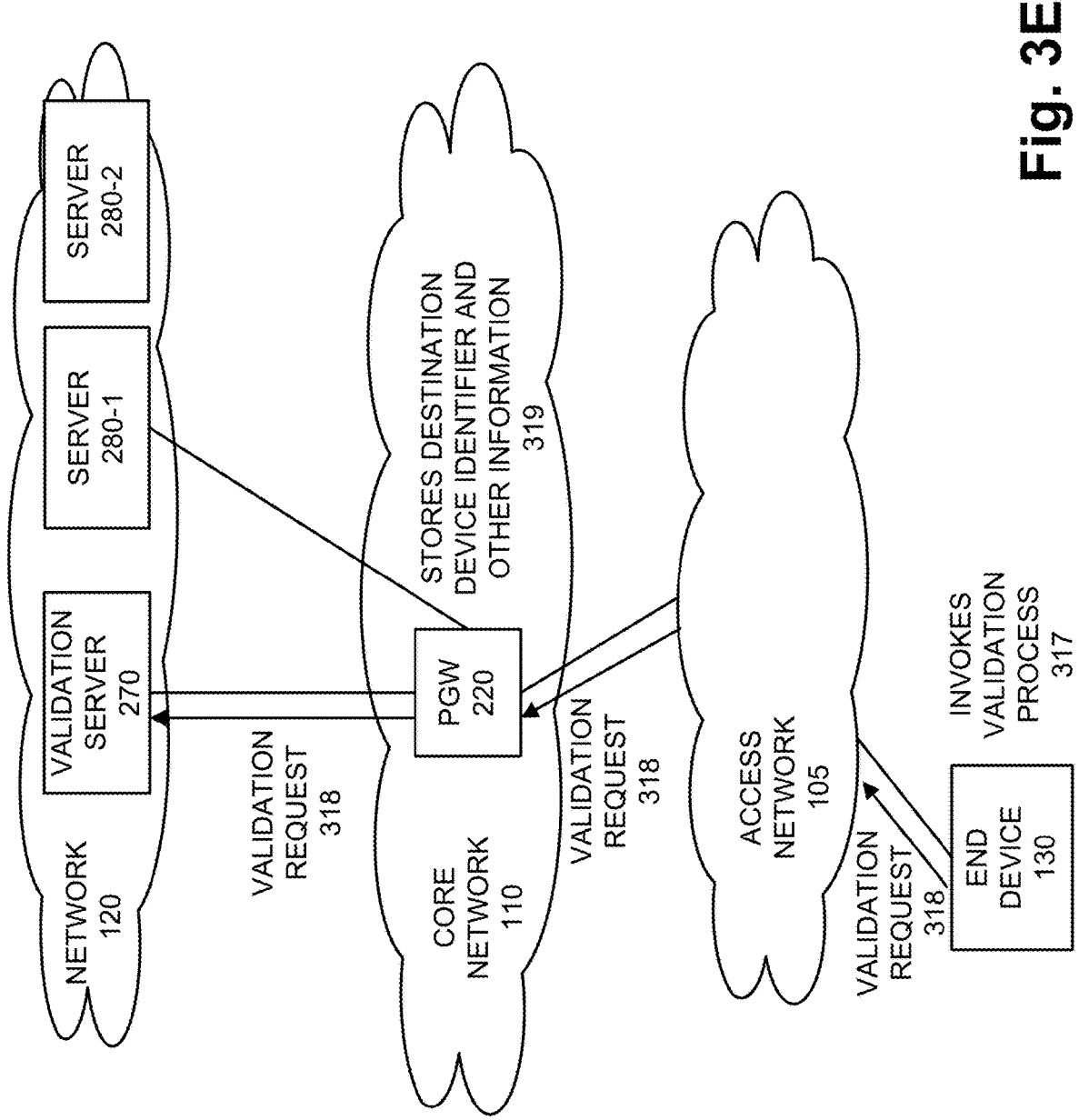

Referring to FIG. 3C, assume that the agent 135 is configured to not initiate the validation process upon initially establishing a PDU session with server 280-1. As illustrated, for example, subsequent to the attachment procedure, end device 130 may establish a session (309) with server 280-1. Referring to FIG. 3D, according to this exemplary scenario, server 280-1 may provide a destination device identifier (315) to end device 130 during the session. The destination device identifier may pertain to server 280-2 (e.g., a data flow to be established between server 280-2 and end device 130). According to another exemplary scenario, server 280-2 may provide the destination device identifier to end device 130. In response to receiving the destination device identifier, end device 130 may invoke a validation process (317). Referring to FIG. 3E, which is similar to FIG. 3B, end device 130 generates and transmits a validation request (318) to validation server 270 via PGW 220. However, in contrast to FIG. 3B, the validation request includes the destination device identifier obtained from server 280-1 and pertains to server 280-2. The validation request may be transmitted on the data plane. For example, the validation request may be included in an application layer message. By way of further example, the validation request may be included in a Hypertext Transfer Protocol (HTTP) message, an HTTP Secure (HTTPS) message, or some other application layer protocol message (e.g., Real-time Transport Protocol (RTP), etc.). As further illustrated, PGW 220 may store the destination device identifier and other information (319). For example, the other information may be the source address of end device 130, an identifier that identifies end device 130 (e.g., an International Mobile Subscriber Identity (IMSI), etc.), a date and timestamp, an identifier that identifies the data flow on which the validation request is transmitted, and so forth. In this way, PGW 220 may use this information as a basis to monitor and/or determine whether or not the destination device identifier is valid, with respect to end device 130, based on the validation process performed by validation server 270.

Figure 3F:
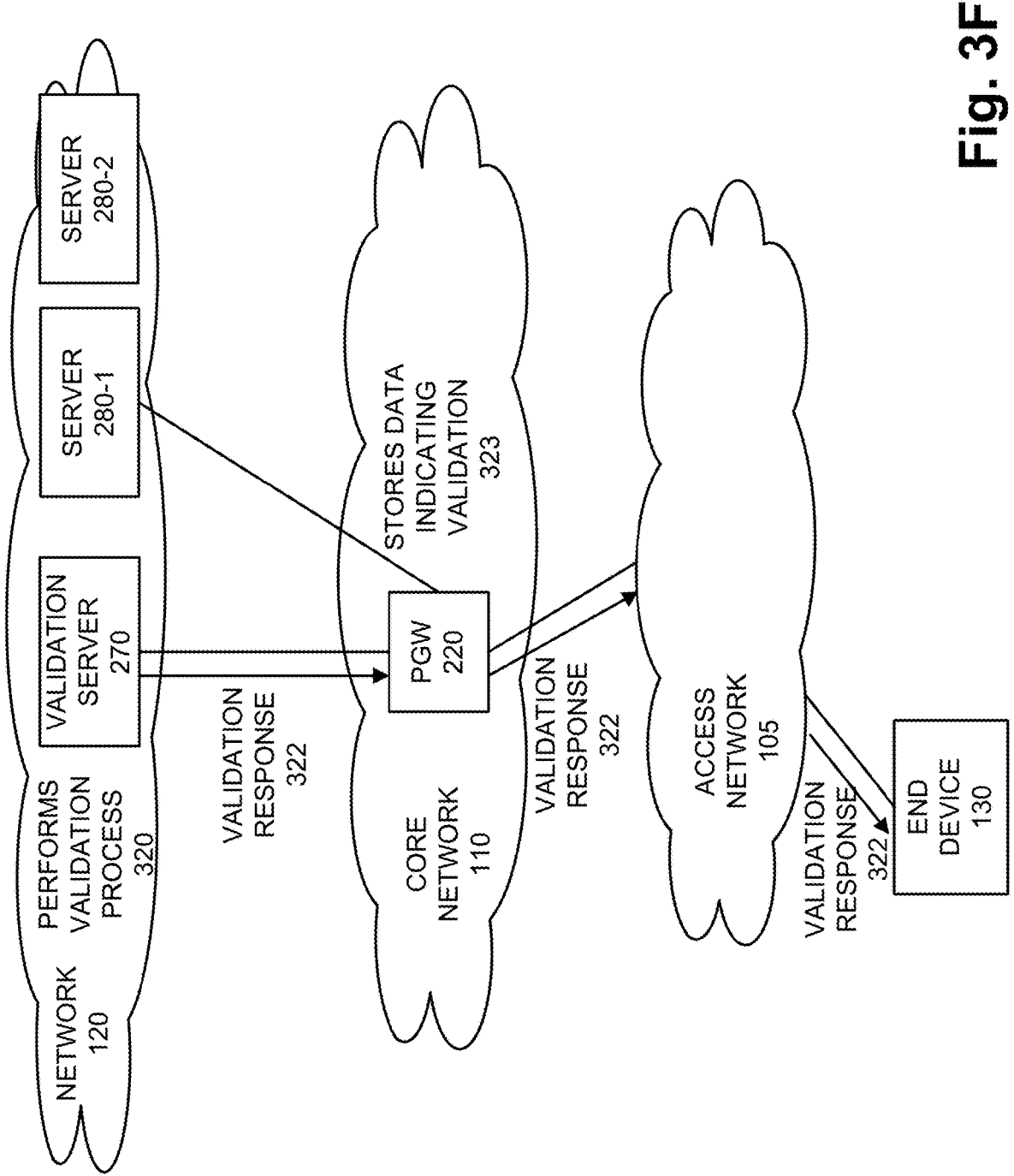

Referring to FIG. 3F, in response to receiving the validation request, validation server 270 may perform a validation process (320). According to an exemplary embodiment, the validation process includes storage validation information that may be used for comparison with destination device identifiers received from end devices 130. Exemplary validation information is described further below.

Referring to FIG. 4A, an exemplary list 400 is illustrated, which stores exemplary validation information. As illustrated, list 400 includes entries 410-1 through 410-X (also referred to as entries 410 and, generally or individually as entry 410). Entry 410 may store a destination device identifier. According to various exemplary implementations, list 400 may include a white list that stores destination device identifiers that are valid, a black list that stores destination device identifiers that are not valid, or a combination of both. The validation information is illustrated in a list form merely for the sake of description. The list may be implemented in a data structure different from a list (e.g., a database, a flat file, etc.).

According to other exemplary implementations, list 400 may store additional and/or different instances of validation information in support of the data flow management service, as described herein.

Figure 4B:
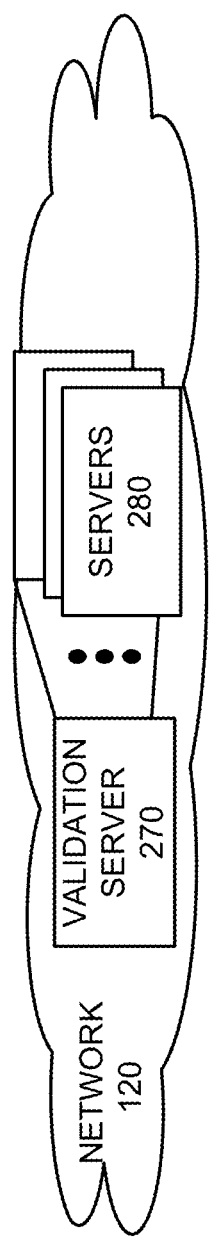
FIG. 4B is a diagram illustrating an exemplary validation process.

Referring to FIG. 4B, additionally, or alternatively, validation server 270 may perform other operations during the validation process. For example, validation server 270 may obtain or generate validation information that includes all potential candidate destination device identifiers. For example, validation server 270 may be configured with a network address, a domain, a sub-domain, etc., associated with a network and/or potential candidate destination devices (e.g., servers 280). Validation server 270 may periodically or in response to a triggering event (e.g., a message from the network that includes the candidate destination devices) obtain (e.g., via a push method or a pull method) a candidate pool of destination device identifiers. Validation server 270 may store the updated version of validation information in list 400.

Referring back to FIG. 3F, according to this exemplary scenario, assume that the result of the validation process indicates that the destination device identifier of server 280-2 is valid. In response, validation server 270 generates and transmits a validation response (322) to end device 130 via PGW 220. For example, the validation response may be implemented as an acknowledgement (ACK) message or another type of message that includes data indicating that the destination device identifier is valid. As further illustrated, PGW 220 may store data indicating validation (323). For example, the data may be mapped to or correlated with the destination device identifier and other information previously stored in step (319). By way of further example, PGW 220 may use the stored other information and corresponding information included in the validation response (e.g., a destination address for end device 130, which is the same as the stored source address; an identifier of end device 130, an identifier that identifies the data flow on which the validation response is transmitted, etc.) to correlate the data/destination device identifier with the stored destination device identifier and the other information.

Figure 3G:
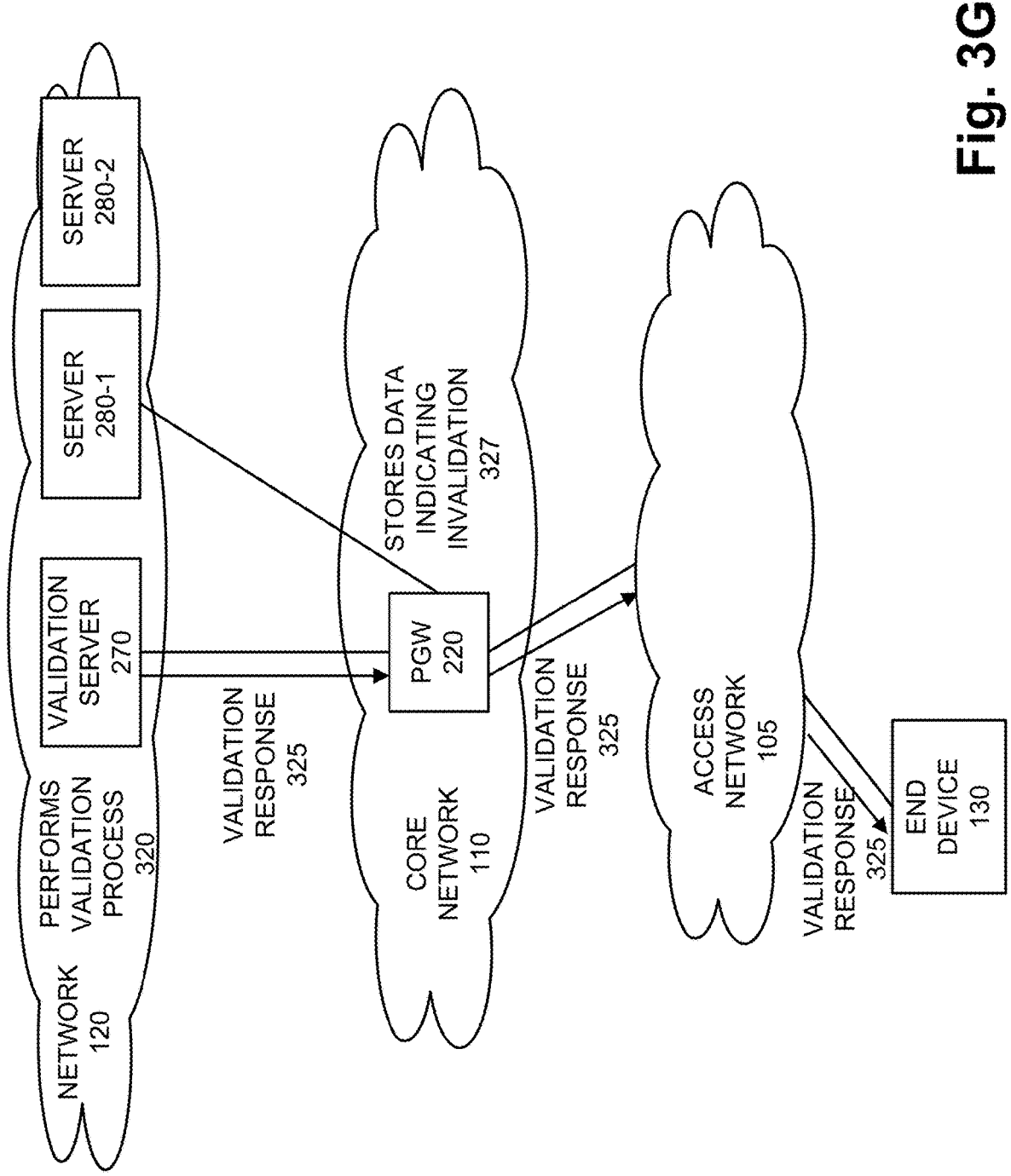

Referring to FIG. 3G, however, according to another exemplary scenario, when the result of the validation process indicates that the destination device identifier of server 280-2 is not valid, validation server 270 may generate and transmit a validation response (325) to end device 130 via PGW 220. The validation response may be implemented as a negative acknowledgement (NACK) message or another type of message that includes data indicating that the destination device identifier is not valid. As further illustrated, PGW 220 may store data indicating invalidation (327). For example, the data may be mapped to or correlated with the destination device identifier and other information previously described.

According to another exemplary scenario, as previously described, when the result of the validation process indicates that the destination device identifier of server 280-2 is not valid, validation server 270 may omit to generate and transmit a validation response to end device 130 via PGW 220. According to such an exemplary implementation, PGW 220 may determine the omission of the validation response based on a timeout period. PGW 220 may store data indicating invalidation, as previously described.

Referring to FIG. 3H, in response to receiving the validation response that indicates the destination device identifier is valid, end device 130 initiates a PDU session (330) with server 280-2. For example, messages may be exchanged to establish a session (332) between end device 130 and server 280-2 via PGW 220, and a session may ensue. As further illustrated, based on the data stored at PGW 220, PGW 220 may apply a same rule (335) compared to the rule applied to the session between end device 130 and server 280-1. According to various exemplary embodiments, PGW 220 may or may not enforce the same rule to the data flow/session between end device 130 and server 280-2 compared to the data flow/session between end device 130 and server 280-1. For example, based on the type of network that includes server 280-2, the type of data communicated between end device 130 and server 280-2, etc., PGW 220 may increase or decrease a maximum bitrate (MBR) value, or adjust other parameters (e.g., charging parameters, QoS parameters, traffic parameters, etc.) that govern the data flow.

Additionally, although not illustrated, upon completion of the session with server 280-2, end device 130 may re-establish a session with server 280-1 (or establish a new session with another server 280). According to various exemplary embodiments, end device 130 may or may not initiate another validation process. For example, if end device 130 receives the destination device identifier of server 280-1, end device 130 may compare the destination device identifier to the pre-configured destination device identifier stored at end device 130. When the destination device identifiers match, end device 130 may forego the validation process. When the destination device identifiers do not match, end device 130 may invoke the validation process. Alternatively, end device 130 may be configured to validate every destination device identifier.

Referring to FIG. 3I, in response to receiving the validation response that indicates the destination device identifier is valid (or no validation response is received), end device 130 may (or may not) initiate a PDU session. According to an exemplary embodiment, agent 135 may include logic to omit to initiate a PDU session. According to another exemplary embodiment, as illustrated in FIG. 3I, agent 135 may initiate a PDU session (338) with server 280-2. For example, messages may be exchanged to establish a session (340) between end device 130 and server 280-2 via PGW 220, and a session may ensue. As further illustrated, based on the data stored at PGW 220, PGW 220 may apply a different rule (342) compared to the rule applied to the session between end device 130 and server 280-1. According to various exemplary embodiments, PGW 220 may or may not enforce the same rule to the data flow/session between end device 130 and server 280-2 compared to the data flow/session between end device 130 and server 280-1.

Although FIGS. 3A-3I illustrate an exemplary process of the data flow management service, according to other exemplary embodiments, additional, fewer, and/or different operations of the data flow enforcement service may be performed. Additionally, or alternatively, depending on the implementation of core network 110, network device 115 that includes the data flow management service may be implemented by a network device different from a PGW, such as, for example, a UPF, an HA, a GGSN, some other node that is an anchor in the core network for PDU sessions, as previously described.

FIG. 5 is a diagram illustrating exemplary components of a device 500 that may correspond to one or more of the devices described herein. For example, device 500 may correspond to components included in network devices 115, network devices 125, end device 130, and exemplary implementations of the same (e.g., PGW 220, validation server 270, servers 280, PCRF 235, etc.). As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with reference to network device 115, software 520 may include an application that, when executed by processor 510, provides the functions of the data flow management service, as described herein. Similarly, network device 125 may include an application that, when executed by processor 510, provides the functions of the data flow management service, as described herein. Software 520 may also include firmware, middleware, microcode, hardware description language (HDL), and/or other form of instruction. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, etc.).

Input 530 permits an input into device 500. For example, input 530 may include a keyboard, a mouse, a display, a touchscreen, a touchless screen, a button, a switch, an input port, speech recognition logic, and/or some other type of visual, auditory, tactile, etc., input component. Output 535 permits an output from device 500. For example, output 535 may include a speaker, a display, a touchscreen, a touchless screen, a light, an output port, and/or some other type of visual, auditory, tactile, etc., output component.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6:
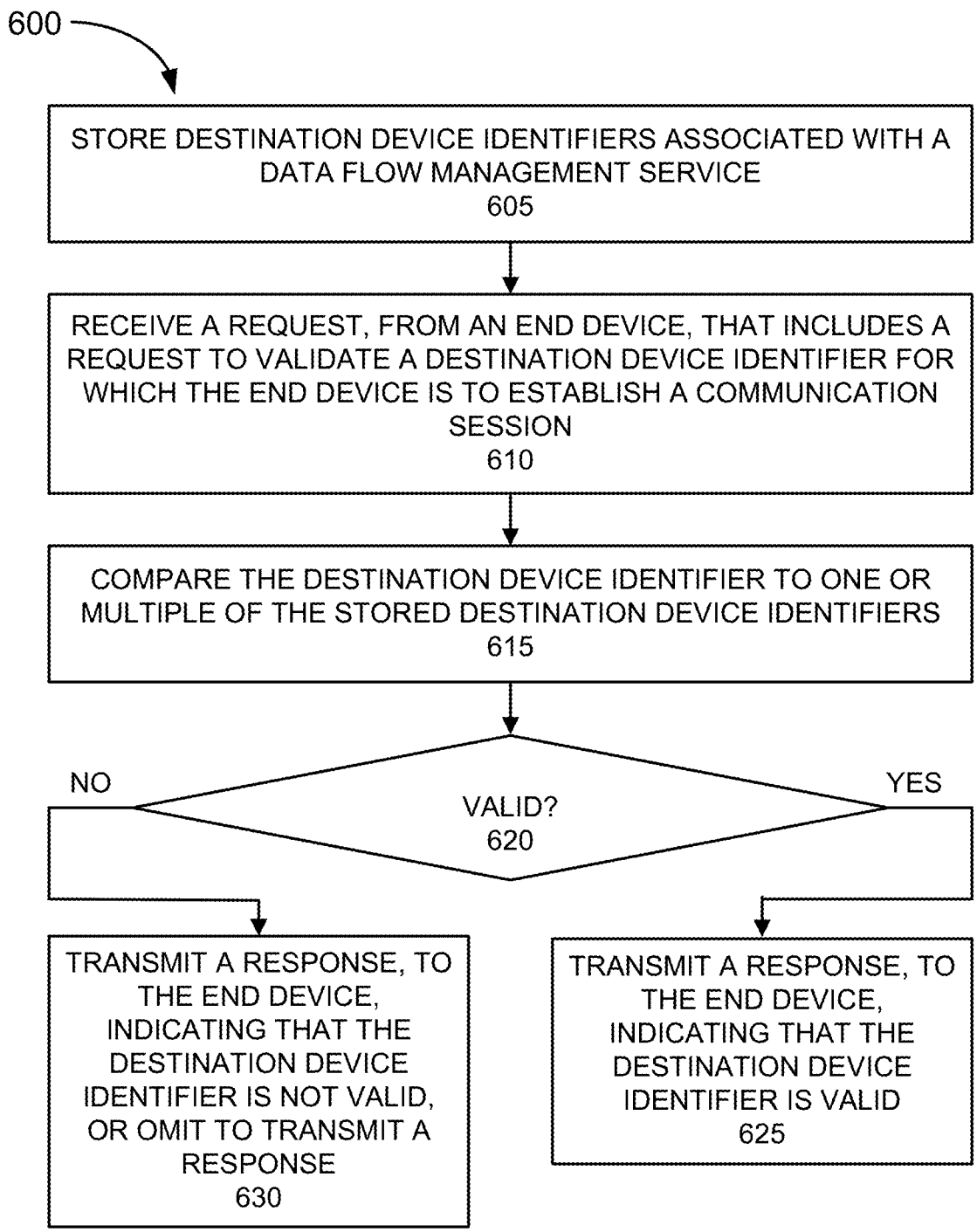
FIG. 6 is a flow diagram illustrating an exemplary process of an exemplary embodiment of the data flow management service.

FIG. 6 is a flow diagram illustrating an exemplary process 600 of an exemplary embodiment of the data flow management service. Process 600 is directed to a process previously described with respect to FIGS. 3A-3I, as well as elsewhere in this description, in which the data flow management service is provided. According to an exemplary embodiment, network device 125 performs steps of process 600. For example, processor 510 of validation server 270 executes software 520 to perform the steps illustrated in FIG. 6, and described herein.

Referring to FIG. 6, in block 605, destination device identifiers associated with a data flow management service are stored. For example validation server 270 may store a list or other data structure (e.g., a file, a database, etc.) that indicates valid and/or invalid destination device identifiers. As previously described, the destination device identifiers may be destination device identifiers that may be subject or not subject to a rule associated with end device 130/agent 135 and a data subscription/data usage. Validation server 270 may refresh the destination device identifiers in response to a trigger or a time-based framework (e.g., periodically, etc.).

In block 610, a request from an end device, which includes a request to validate a destination device identifier for which the end device is to establish a communication session, is received. For example, validation server 270 may receive a validation request from end device 130 via an anchor node for PDU sessions (e.g., PGW 220). The validation request may include a destination device identifier of a server 280.

In block 615, the destination device identifier is compared to one or multiple destination device identifiers. For example, validation server 270 may compare the destination device identifier received from end device 130 to valid and/or invalid destination device identifiers stored by validation server 270.

In block 620, based on the comparison, it may be determined whether the destination device identifier is valid. For example, when the destination device identifier matches a stored destination device identifier that is valid, validation server 270 may determine that the destination device identifier is valid. Alternatively, for example, when the destination device identifier matches a destination device identifier that is not valid, or does not match one of the stored destination device identifiers that are valid, validation server 270 may determine that the destination device identifier is not valid.

In block 625, in response to determining that the destination device identifier is valid (block 620—YES), a response, which indicates that the destination device identifier is valid, is transmitted to the end device, via the anchor node. For example, validation server 270 may transmit the response to end device 130 via PGW 220. In block 630, in response to determining that the destination device identifier is not valid (block 620—NO), a response, which indicates that the destination device identifier is not valid, is transmitted to the end device, via the anchor node. For example, validation server 270 may transmit the response to end device 130 via PGW 220. Alternatively, as previously described, validation server 270 may omit to transmit a response to end device 130 in response to determining that the destination device identifier is not valid.

Although FIG. 6 illustrates an exemplary process 600 of the data flow management service, according to other embodiments, process 600 may include additional operations, fewer operations, and/or different operations than those illustrated in FIG. 6, and described herein.

Figure 7A:
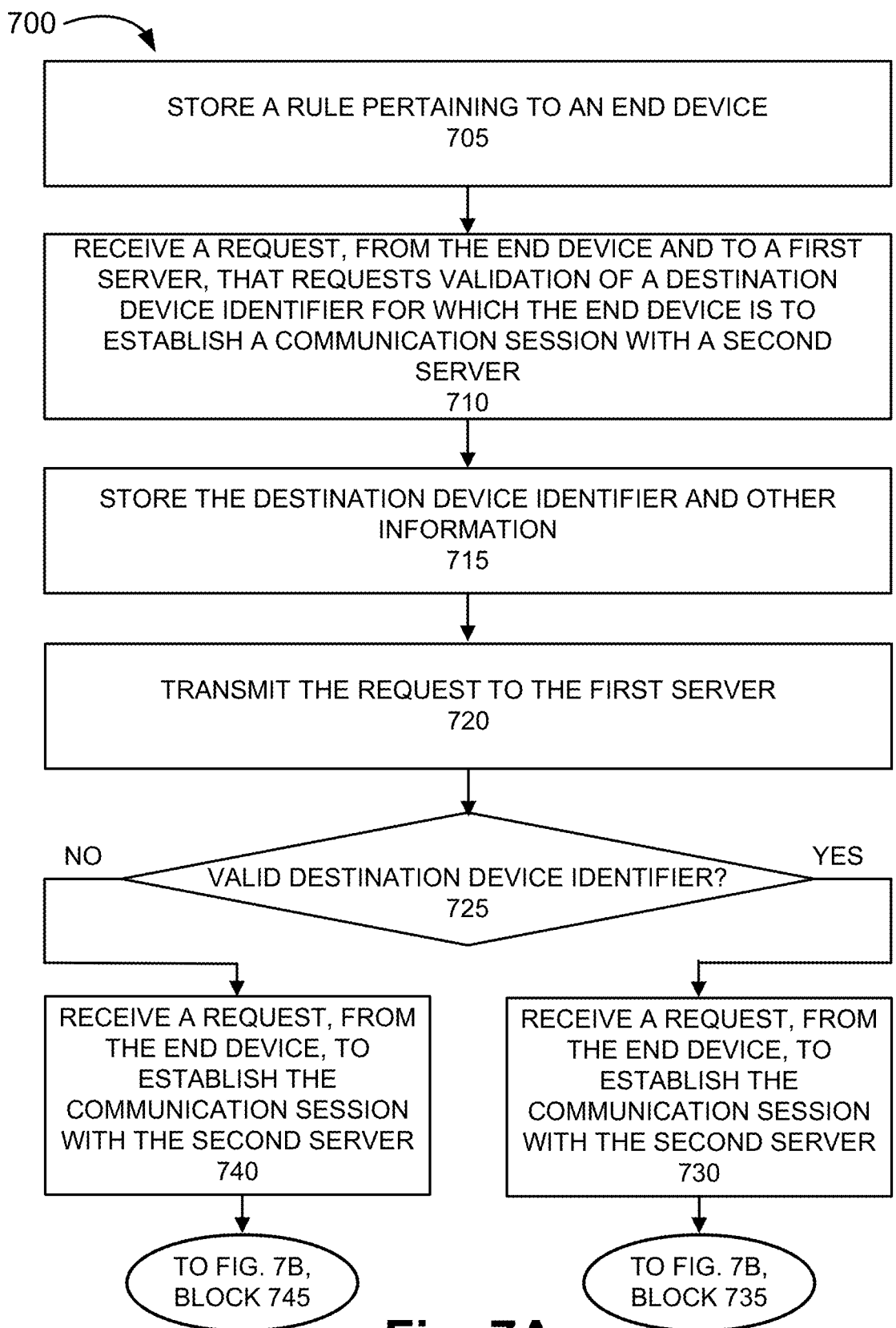
FIGS. 7A and 7B are flow diagrams illustrating another exemplary process of an exemplary embodiment of the data flow management service.
Figure 7B:
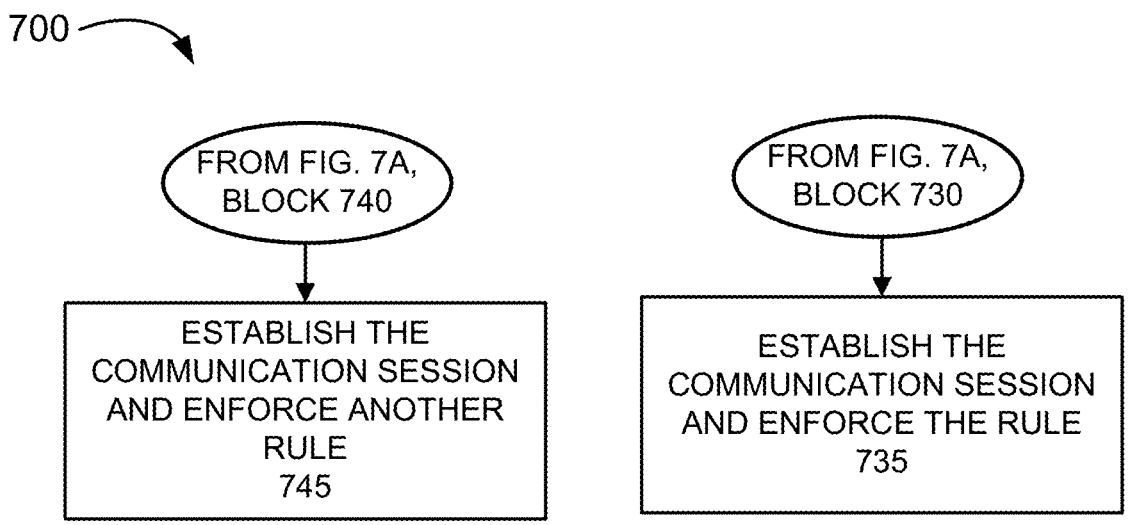

FIGS. 7A and 7B are flow diagrams illustrating an exemplary process 700 of an exemplary embodiment of the data flow management service. Process 700 is directed to a process previously described with respect to FIGS. 3A-3I, as well as elsewhere in this description, in which the data flow management service is provided. According to an exemplary embodiment, network device 115 performs steps of process 700. For example, processor 510 of PGW 220 or other anchor node executes software 520 to perform the steps illustrated in FIGS. 7A and 7B, and described herein.

In block 705, a rule pertaining to an end device may be stored. For example, during an attachment procedure of the end device with a core network, PGW 220 may receive PCC information from PCRF 235.

In block 710, a request from the end device and to a first server, that requests validation of a destination device identifier for which the end device is to establish a communication session with a second server, is received. For example, PGW 220 may receive a validation request that includes a destination device identifier of server 280, as previously described. The destination device identifier may relate to a particular application resident on the end device.

In block 715, the destination device identifier and other information may be stored. For example, PGW 220 may store the destination device identifier and other information (e.g., a source address of end device 130, an identifier that identifies end device 130 (e.g., an IMSI, etc.), a date and timestamp, an identifier that identifies the data flow on which the validation request is transmitted, etc.). For example, PGW 220 may perform a packet inspection of the request.

In block 720, the request is transmitted to the first server. For example, in response to the storing, PGW 220 may transmit the request to validation server 270. In block 725, it is determined whether the destination device identifier is valid. For example, according to various exemplary embodiments, validation server 270 may transmit a validation response, which indicates that the destination device identifier is valid or not. Alternatively, validation server 270 may not transmit a validation response when the destination device identifier is not valid. PGW 220 may determine whether the destination device identifier is valid based on the messaging (or absence of messaging) between validation server 270 and end device 130. PGW 220 may store data indicating that the destination device identifier is valid or not valid in response to the determination. PGW 220 may also transmit the validation response received from validation server 270 to end device 130.

In block 730, when it is determined that the destination device identifier is valid (block 725—YES), the rule may be enforced for the communication session with the second server (block 735). For example, PGW 220 may receive a request from end device 130 to establish a communication session with server 280 (block 730), and in block 735 of FIG. 7B, establish the communication session and enforce the rule, as previously described. The request to establish the data flow with server 280 may stem from the same application, as previously described. The rule may include parameter values pertaining to charging, QoS, and/or traffic shaping.

Referring to back to FIG. 7A, when it is determined that the destination device identifier is not valid (block 725—NO), the rule may not be enforced for the communication session with the second server (block 745). For example, PGW 220 may receive a request from end device 130 to establish a communication session with server 280 (block 740), and in block 745 of FIG. 7B, establish the communication session and not enforce the rule, as previously described.

Although FIGS. 7A and 7B illustrate an exemplary process 700 of the data flow management service, according to other embodiments, process 700 may include additional operations, fewer operations, and/or different operations than those illustrated in FIGS. 7A and 7B, and described herein.

Figure 8:
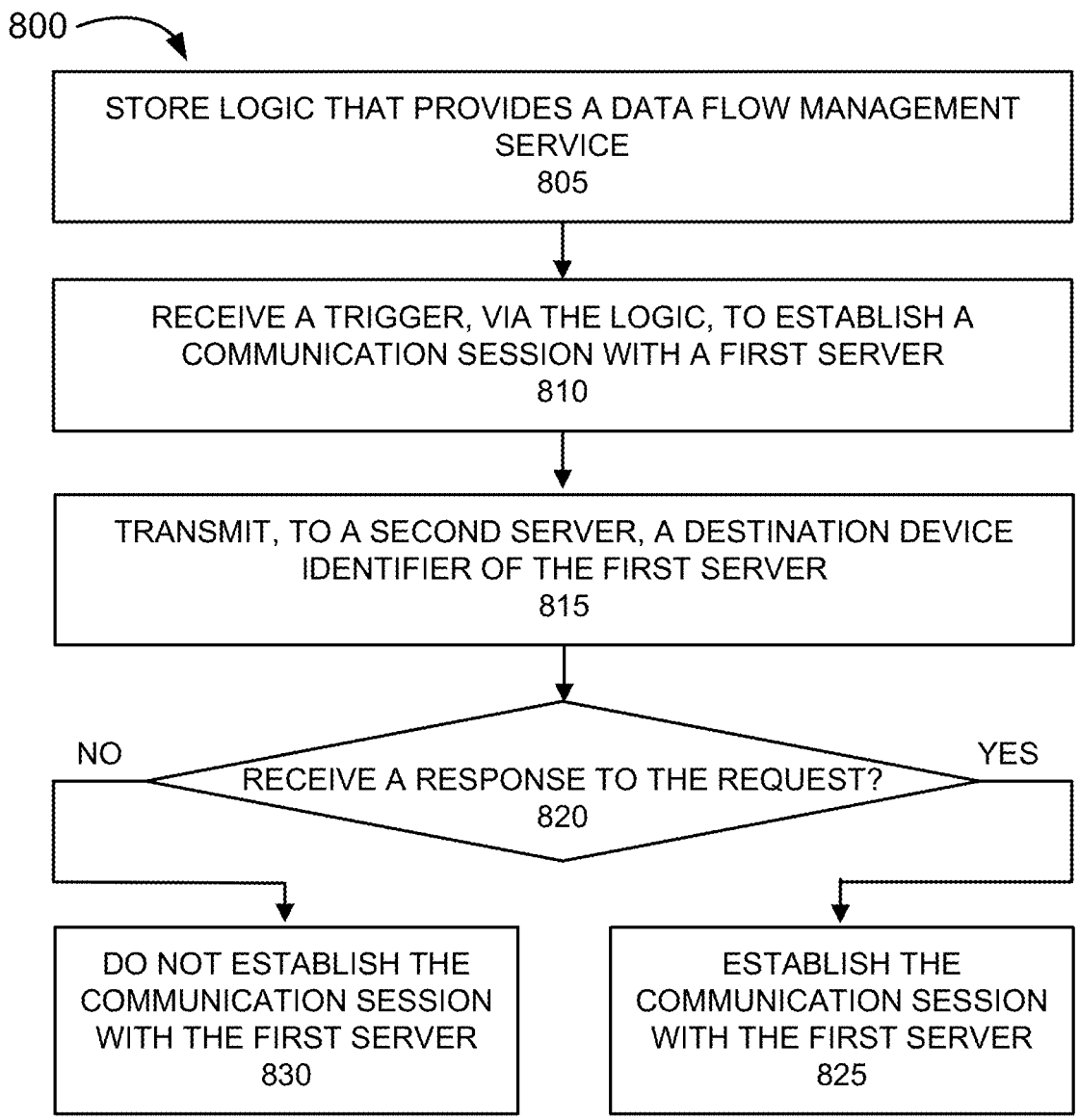
FIG. 8 is a flow diagram illustrating yet another exemplary process of an exemplary embodiment of the data flow management service.

FIG. 8 is a flow diagram illustrating an exemplary process 800 of an exemplary embodiment of the data flow management service. Process 800 is directed to a process previously described with respect to FIGS. 3A-3I, as well as elsewhere in this description, in which the data flow management service is provided. According to an exemplary embodiment, end device 130 performs steps of process 800. For example, processor 510 of end device 130 executes software 520 to perform the steps illustrated in FIG. 8, and described herein. By way of further example, a mobile application of end device 130 may include agent 135 that provides the data flow management service.

In block 805, the end device may store logic that provides the data flow management service. For example, an application stored by end device 130 may include agent 135. As an example, agent 135 may be implemented as a plug-in, a stand-alone application, etc., as previously described.

In block 810, a trigger to establish a communication session with a first server may be received via the logic. For example, as previously described, according to various exemplary embodiments, the trigger may be when an application is initially executed (e.g., a user opens an application), or the trigger may occur subsequent to the execution of the application and during a communication session (e.g., receive a message from server 280).

In block 815, in response to the trigger, a destination device identifier of the first server is transmitted to a second server. For example, end device 130 may generate a message that includes the destination device identifier of server 280. End device 130 may transmit the message to validation server 270 via PGW 220.

In block 820, it is determined whether a response to the request is received. For example, as previously described, according to various exemplary embodiments, validation server 270 may transmit a validation response or not depending on the outcome of the validation process. End device 130 may determine whether the destination device identifier is valid or not based on receipt of the validation response, or the absence thereof.

When it is determined that the destination device identifier is valid (block 820—YES), a communication session with the first server may be established (block 825). For example, end device 130 may establish the communication with the destination device identifier of server 280.

When it is determined that the destination device is not valid (block 820—NO), a communication session with the first server may not be established (block 830). For example, end device 130 may not establish the communication with the destination device identifier of server 280. Alternatively, end device 130 may establish the communication session regardless of the validity of the destination device identifier, as previously described.

Although FIG. 8 illustrates an exemplary process 800 of the data flow management service, according to other embodiments, process 800 may include additional operations, fewer operations, and/or different operations than those illustrated in FIG. 8, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described with regard to the processes illustrated in FIGS. 6, 7A, 7B, and 8, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 510) of a computational device. A non-transitory storage medium includes one or more of the storage mediums described in relation to memory/storage 515.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
    storing, by a network device of a core network, a rule pertaining to data usage of an application of an end device and a data service subscription, wherein the network device is a packet data network gateway or a user plane function;
    establishing, by the network device based on the rule, a communication session between the application of the end device and an application server associated with the data service subscription;
    receiving, by the network device from the application of the end device during the communication session, a first request to authenticate a first destination device identifier of a first network device that is selected by the application server and communicated to the end device via the network device, wherein the first network device is an advertisement server;
    storing, by the network device in response to the receiving, the first destination device identifier;
    transmitting, by the network device and to a second network device, the first request in response to the storing of the first destination device identifier;
    determining, by the network device subsequent to the transmitting, whether the first destination device identifier is valid under the data usage;
    receiving, by the network device and from the application of the end device, a second request to establish a first communication session with the first network device subsequent to determining that the first destination device identifier is valid; and
    enforcing, by the network device and in response to the receiving of the second request, the rule.

2. The method of claim 1, wherein the determining comprises:
    receiving, by the network device and from the second network device, a first response that indicates that the first destination device identifier is valid; and
    determining, by the network device in response to receiving the first response, that the first destination device identifier is valid.

3. The method of claim 2, wherein the storing of the first destination device identifier further comprises:
    storing, by the network device, at least one of a source address of the end device, an identifier of the end device, or an identifier of a data flow that is associated with the first request.

4. The method of claim 3, wherein the determining further comprises:
    correlating, by the network device, the at least one of the source address of the end device, the identifier of the end device, or the identifier of the data flow with the first response.

5. The method of claim 1, wherein the destination device identifier includes a full or a portion of a uniform resource identifier, a hostname, or a server name indication of the first network device.

6. The method of claim 1, wherein the rule pertains to at least one of charging, quality of service, or traffic shaping.

7. The method of claim 1, further comprising:
    receiving, by the network device and from the application of the end device subsequent to the enforcing and during the communication session, a third request to authenticate a second destination device identifier of a third network device that is selected by the application server and communicated to the end device via the network device;
    storing, by the network device in response to the receiving of the third request, the second destination device identifier;
    transmitting, by the network device and to the second network device, the third request in response to the storing of the second destination device identifier;

determining, by the network device and subsequent to the transmitting of the third request, whether the second destination device identifier is valid under the data usage; and enforcing, by the network device, another rule in response to determining that the second destination device identifier is not valid.

8. The method of claim 7, wherein the determining whether second destination device identifier is valid comprises:

not receiving, by the network device and from the second network device, a second response that indicates that the second destination device identifier is valid; and determining, by the network device, after a time out period has transpired subsequent to the not receiving, that the second destination device identifier is not valid.

9. A network device comprising:
a communication interface;
a memory, wherein the memory stores instructions; and
a processor, wherein the processor executes the instructions to:
store in the memory, a rule pertaining to data usage of an application of an end device and a data service subscription, wherein the network device is a packet data network gateway or a user plane function of a core network;
establish, via the communication interface based on the rule, a communication session between the application of the end device and an application server associated with the data service subscription;
receive, via the communication interface from the application of the end device during the communication session, a first request to authenticate a first destination device identifier of a first network device that is selected by the application server and communicated to the end device via the network device, wherein the first network device is an advertisement server;
store in the memory, in response to the receipt of the first request, the first destination device identifier;
transmit, via the communication interface to a second network device, the first request in response to the storage of the first destination device identifier;
determine, subsequent to the transmission, whether the first destination device identifier is valid under the data usage;
receive, via the communication interface from the application of the end device, a second request to establish a first communication session with the first network device subsequent to determining that the first destination device identifier is valid; and
enforce, in response to the receipt of the second request, the rule.

10. The network device of claim 9, wherein, when determining, the processor further executes the instructions to:
receive, via the communication interface from the second network device, a first response that indicates that the first destination device identifier is valid; and
determine, in response to receipt of the first response, that the first destination device identifier is valid.

11. The network device of claim 10, wherein, when storing the first destination device identifier, the processor further executes the instructions to:
store at least one of a source address of the end device, an identifier of the end device, or an identifier of a data flow that is associated with the first request.

12. The network device of claim 11, wherein, when determining, the processor further executes the instructions to:
correlate the at least one of the source address of the end device, the identifier of the end device, or the identifier of the data flow with the first response.

13. The network device of claim 9, wherein the destination device identifier includes a full or a portion of a uniform resource identifier, a hostname, or a server name indication of the first network device.

14. The network device of claim 9, wherein the rule pertains to at least one of charging, quality of service, or traffic shaping.

15. The network device of claim 9, wherein the processor further executes the instructions to:
receive, via the communication interface and from the application of the end device subsequent to the enforcement and during the communication session, a third request to authenticate a second destination device identifier of a third network device that is selected by the application server and communicated to the end device via the network device;
store in the memory, in response to the receipt of the third request, the second destination device identifier;
transmit, via the communication interface and to the second network device, the third request in response to the storage of the second destination device identifier;
determine, subsequent to the transmission of the third request, whether the second destination device identifier is valid under the data usage; and
enforce another rule in response to a determination that the second destination device identifier is not valid.

16. A non-transitory, computer-readable storage medium storing instructions executable by a processor of a device, wherein the device is a packet data network gateway or a user plane function of a core network, which when executed cause the device to:
store a rule pertaining to data usage of an application of an end device and a data service subscription;
establish, based on the rule, a communication session between the application of the end device and an application server associated with the data service subscription;
receive from the application of the end device during the communication session, a first request to authenticate a first destination device identifier of a first network device that is selected by the application server and communicated to the end device via the device, wherein the first network device is an advertisement server;
store in response to the receipt of the first request, the first destination device identifier;
transmit to a second network device, the first request in response to the storage of the first destination device identifier;
determine, subsequent to the transmission, whether the first destination device identifier is valid under the data usage;
receive, from the application of the end device, a second request to establish a first communication session with the first network device subsequent to determining that the first destination device identifier is valid; and
enforce, in response to the receipt of the second request, the rule.

17. The non-transitory, computer-readable storage medium of claim 16, further storing instructions executable by the processor of the device, which when executed cause the device to:
   receive from the second network device, a first response that indicates that the first destination device identifier is valid; and
   determine, in response to receipt of the first response, that the first destination device identifier is valid.

18. The non-transitory, computer-readable storage medium of claim 17, wherein the instructions further include instructions executable by the processor of the device, which when executed cause the device to:
   store at least one of a source address of the end device, an identifier of the end device, or an identifier of a data flow that is associated with the first request.

19. The non-transitory, computer-readable storage medium of claim 18, wherein the instructions further include instructions executable by the processor of the device, which when executed cause the device to:
   correlate the at least one of the source address of the end device, the identifier of the end device, or the identifier of the data flow with the first response.

20. The non-transitory, computer-readable storage medium of claim 16, wherein the rule pertains to at least one of charging, quality of service, or traffic shaping.

\* \* \* \* \*